(12) United States Patent
Luffy

(10) Patent No.: US 6,886,508 B1
(45) Date of Patent: May 3, 2005

(54) DUAL SHUT-OFF VALVE FOR TWO-CYCLE ENGINES

(76) Inventor: William D. Luffy, 1425 E. Hammond La., Phoenix, AZ (US) 85034

( * ) Notice: Subject to any disclaimer, the term of this patent is extended or adjusted under 35 U.S.C. 154(b) by 124 days.

(21) Appl. No.: 10/222,565

(22) Filed: Aug. 15, 2002

Related U.S. Application Data

(60) Provisional application No. 60/312,607, filed on Aug. 15, 2001.

(51) Int. Cl.[7] ............................................. F16K 11/087
(52) U.S. Cl. .............................. 123/73 AD; 123/198 B; 137/1; 137/595
(58) Field of Search ............... 137/595, 1; 123/73 AD, 123/198 B

(56) References Cited

U.S. PATENT DOCUMENTS

| | | | |
|---|---|---|---|
| 2,523,937 A | * | 9/1950 | Barkley .................... 123/198 B |
| 3,234,958 A | * | 2/1966 | Butters ........................ 137/328 |
| 3,913,551 A | * | 10/1975 | Shaver ................. 123/198 DB |
| 4,084,657 A | * | 4/1978 | Bradley et al. .......... 123/198 B |
| 4,114,587 A | * | 9/1978 | Amano et al. ............ 123/196 S |
| 4,911,202 A | * | 3/1990 | Nelson ........................ 137/595 |
| 6,206,028 B1 | * | 3/2001 | Holden et al. ............... 137/271 |

* cited by examiner

Primary Examiner—Stephen M. Hepperle
(74) Attorney, Agent, or Firm—Richard E. Oney

(57) ABSTRACT

A dual shut-off valve includes a valve body having a first inlet passage for communicating with the fuel supply line, a second inlet passage for communicating with the oil supply line, a first outlet passage and a second outlet passage. A first valve ball has a center passage and is rotatable between a first valve open position and a first valve closed position. A second valve ball has a center passage and is rotatable between a second valve open position and a second valve closed position. A shaft is coupled between the first valve ball and the second valve ball for rotating the first valve ball between the first valve open and closed positions and simultaneously rotating the second valve ball between the second valve open and closed positions. A handle can be used to rotate the shaft.

20 Claims, 5 Drawing Sheets

DUAL SHUT-OFF VALVE FOR TWO-CYCLE ENGINES

RELATED APPLICATION

This application claims the benefit of U.S. Provisional Application No. 60/312, 607, filed Aug. 15, 2001, entitled "Dual Shut-Off Valve for Two-Cycle Engines," which is incorporated herein by reference.

BACKGROUND

This invention relates to shut-off valves for two-cycle engines. More particularly, it relates to a dual shut-off valve for simultaneously shutting off the fuel supply and the oil supply to a two-cycle engine.

Spark-ignited two-cycle (two-stroke) internal combustion engines that burn a fuel-and-oil mixture are in wide use. They are presently found in marine outboard engines, snowmobiles, personal water craft, all-terrain vehicles, pumps, electrical generators, power chain saws, power lawn mowers and other power-operated garden equipment, and the like. In some of these applications, the engine will go through extended periods of non-use, such as when a boat, snowmobile, personal watercraft or the like is being stored for an extended time period, such as for the winter. During periods of extended storage, residual fuel in the system can cause damage to the engine. It is desirable, therefore, to remove as much fuel from the engine as possible before placing it in extended storage. Simply disconnecting the fuel and oil supply lines to do this, however, presents several problems. First, disconnecting the lines can result in air in the lines. In addition, if the fuel and oil lines are not disconnected simultaneously, the fuel/oil ratio of the mixture supplied to the engine may change, and damage to the engine can result.

Therefore, there is a need for an apparatus that can be used to simultaneously shut off the fuel supply and the oil supply lines to a two-cycle engine without allowing air to enter the lines. Accordingly, it is an object of this invention to provide such an apparatus.

It is still another object of the invention to provide such an apparatus that is convenient and easy to operate and yet can limit accidental shut-off of the fuel and oil supply lines.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY

To achieve the foregoing objects, and in accordance with the purposes of the invention as embodied and broadly described in this document, I have provided a dual shut-off valve for a two-cycle internal combustion engine having a fuel supply line and an oil supply line. The shut-off valve includes a valve body having a first inlet passage for communicating with the fuel supply line, a second inlet passage for communicating with the oil supply line, a first outlet passage and a second outlet passage. A first valve ball has a center passage and is rotatable between a first valve open position and a first valve closed position. In the first valve open position, the first valve ball center passage is in fluid communication with the first inlet passage and the first outlet passage. In the first valve closed position, the first valve ball center passage is out of fluid communication with the first inlet passage and the first outlet passage. A second valve ball has a center passage and is rotatable between a second valve open position and a second valve closed position. In the second valve open position, the second valve ball center passage is in fluid communication with the second inlet passage and the second outlet passage. In the second valve closed position, the second valve ball center passage is out of fluid communication with the second inlet passage and the second outlet passage. A shaft is coupled between the first valve ball and the second valve ball for rotating the first valve ball between the first valve open and closed positions and simultaneously rotating the second valve ball between the second valve open and closed positions. The valve assembly also includes a handle for rotating the shaft.

BRIEF DESCRIPTION OF THE DRAWINGS

The accompanying drawings, which are incorporated in and constitute a part of the specification, illustrate the presently preferred embodiments and methods of the invention. Together with the general description given above and the detailed description of the preferred embodiments and methods given below, they serve to explain the principles of the invention.

DESCRIPTION

Figure 1:
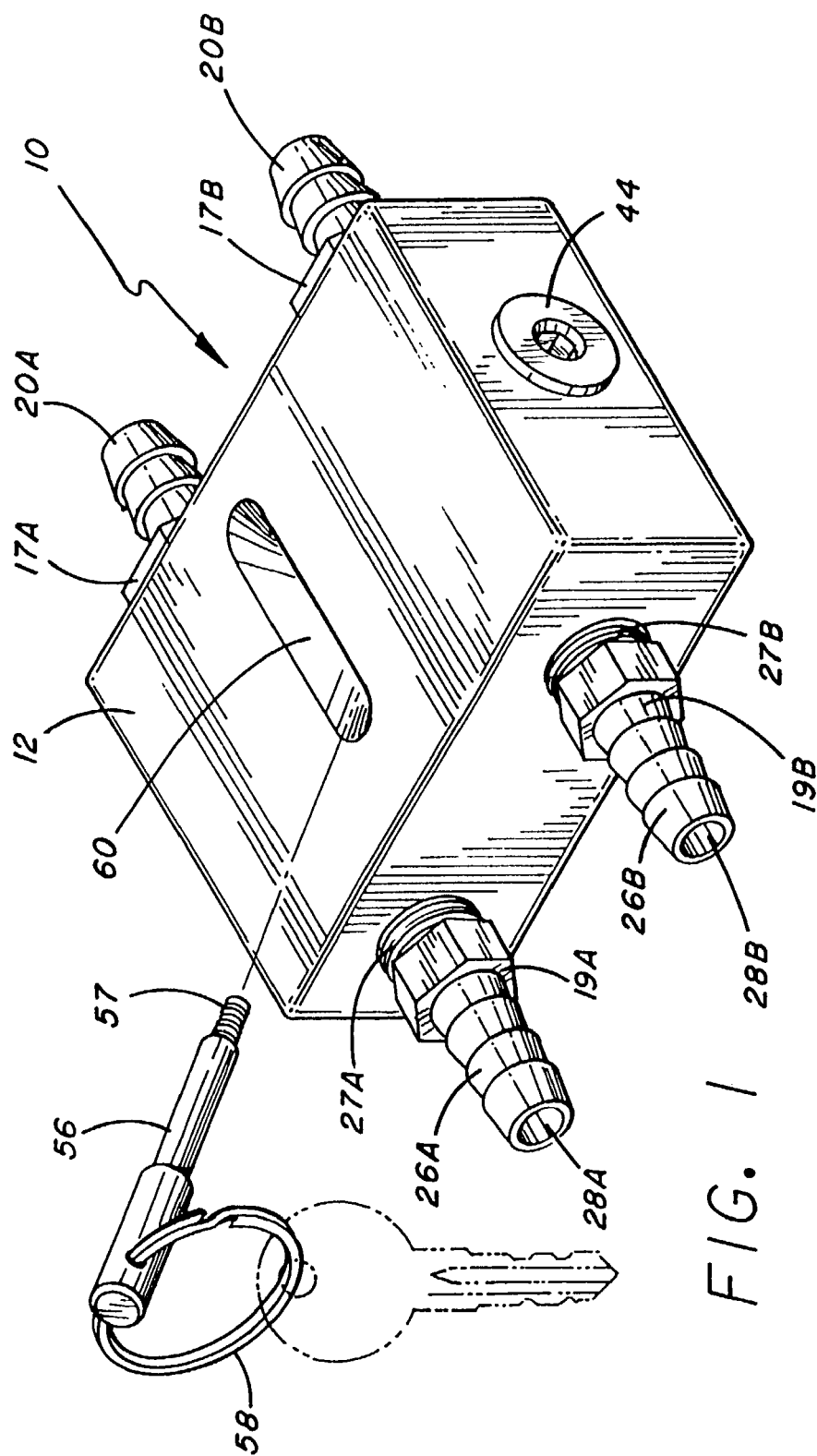
FIG. 1 is a perspective view of one embodiment of a dual shut-off valve according to the invention, showing the handle removed.

Reference will now be made in detail to the presently preferred embodiments and methods of the invention as illustrated in the accompanying drawings, in which like reference characters designate like or corresponding parts throughout the drawings.

Referring to FIGS. 1 through 5, an illustrative embodiment of a dual shut-off valve assembly 10 according to the present invention is shown. The shut-off valve assembly 10 includes a valve body 12 having two parallel bores 13a, 13b extending through the valve body 12. Each parallel bore 13a, 13b has an inlet section 14a, 14b and an outlet section 15a, 15b. Each inlet section 14a, 14b has a threaded portion for mating with a threaded inlet nipple 17a, 17b. Each outlet section 15a, 15b also has a threaded portion for mating with a threaded outlet nipple 19a, 19b. The diameter of each outlet section 15a, 15b is less than that of its corresponding inlet section 14a, 14b, resulting in a shoulder 38a, 38b in the parallel bore at the intersection of the inlet section 14a, 14b and the outlet section 15a, 15b.

Each inlet nipple 17a, 17b has a tapered end 20a, 20b adapted for sealingly receiving a fluid supply line and a threaded end 21a, 21b for mating with the corresponding parallel bore inlet section 14a, 14b. Extending through the length of each inlet nipple 17a, 17b is an inlet passage 22a, 22b in the form of a bore. An O-ring seal 23a, 23b is mounted on each inlet nipple 17a, 17b in an annular groove 32a, 32b disposed between the tapered end 20a, 20b and the threaded end 21a, 21b. The O-ring seal 23a, 123b provides a sealed engagement between the nipple 17a, 17b and the interior wall of the corresponding bore inlet section 14a, 14b when the inlet nipple 17a, 17b is screwed into the inlet section 14a, 14b. The threaded end 21a, 21b of each inlet nipple 17a, 17b terminates in a flat base 24a, 24b for sealingly engaging an inlet valve seat 25a, 25b.

Each outlet nipple 19a, 19b has a tapered end 26a, 26b adapted for sealingly receiving a fluid supply line and a threaded end 27a, 27b for mating with the corresponding parallel bore outlet section 15a, 15b. Extending through the length of each outlet nipple 19a, 19b is an outlet passage 28a, 28b in the form of a bore.

In the preferred embodiment, the tapered end 20a of one inlet nipple 17a is adapted for sealingly receiving and communicating with a fuel line from a fuel supply (not shown), and the corresponding outlet nipple 19a is adapted for sealingly receiving and communicating with a fuel line to the engine (not shown). Similarly, the other inlet nipple 17b is adapted for sealingly receiving and communicating with an oil line from an oil supply (not shown) and the corresponding outlet nipple 19b is adapted for sealingly receiving and communicating with an oil line to the engine (not shown).

Disposed within each parallel bore 13a, 13b in the inlet section 14a, 14b is a valve ball 34a, 34b. Each valve ball seats against an outlet valve seat 30a, 30b, which rests against the corresponding bore shoulder 38a, 38b. When the inlet nipple 17a is tightened, the inlet nipple base 24a is pressed into sealing engagement with the inlet valve seat 25a, the valve ball 34a seats against the inlet valve seat 25a and the outlet valve seat 30a, and the outlet valve seat 30a is pressed into sealing engagement with the bore shoulder 38a. Likewise, when the inlet nipple 17b is tightened, the inlet nipple base 24b is pressed into sealing engagement with the inlet valve seat 25b, the valve ball 34b seats against the inlet valve seat 25b and the outlet valve seat 30b, and the outlet valve seat 30b is pressed into sealing engagement with the bore shoulder 38b. Passing through each valve ball 34a, 34b is a center passage 36a, 36b in the form of a bore disposed along an axis passing through the center of the valve ball 34a, 34b. In addition, each valve ball 34a, 34b has a slot 35a, 35b formed in the surface of the ball generally parallel to its center passage 36a, 36b. The diameter of each ball valve 34a, 34b is such that it fits closely into the corresponding parallel bore intake section 14a, 14b and can be loaded into position through the intake section 14a, 14b.

Figure 3:
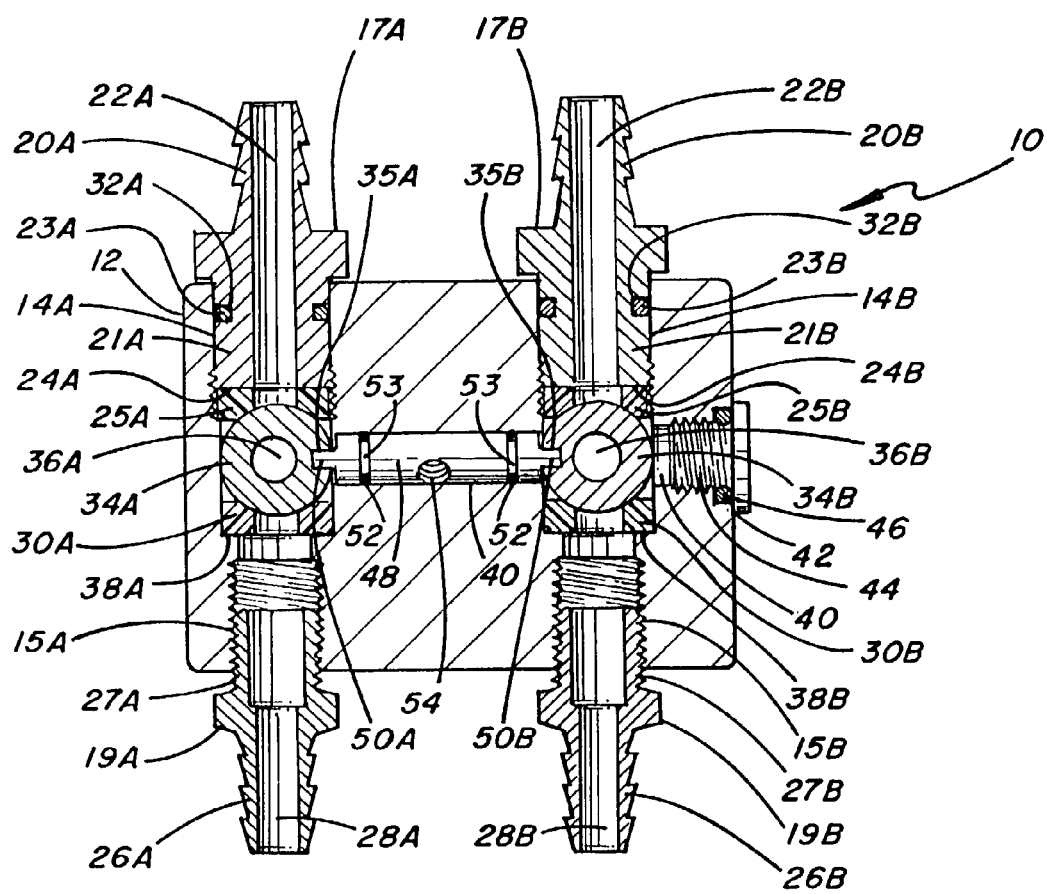
FIG. 3 is a sectional front elevation view of the assembled dual shut-off valve of FIG. 1 showing the valve in the closed position.
Figure 4:
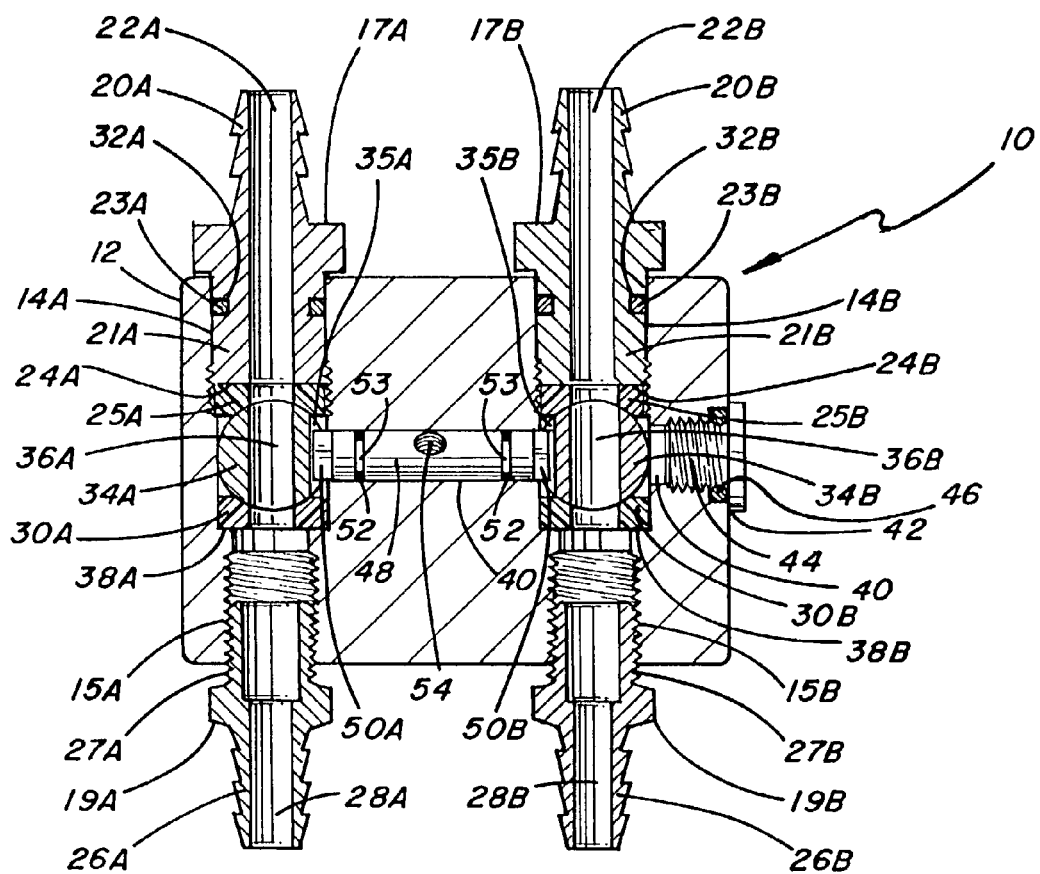
FIG. 4 is a sectional front elevation view of the assembled dual shut-off valve of FIG. 1 showing the valve in the open position.
Figure 5:
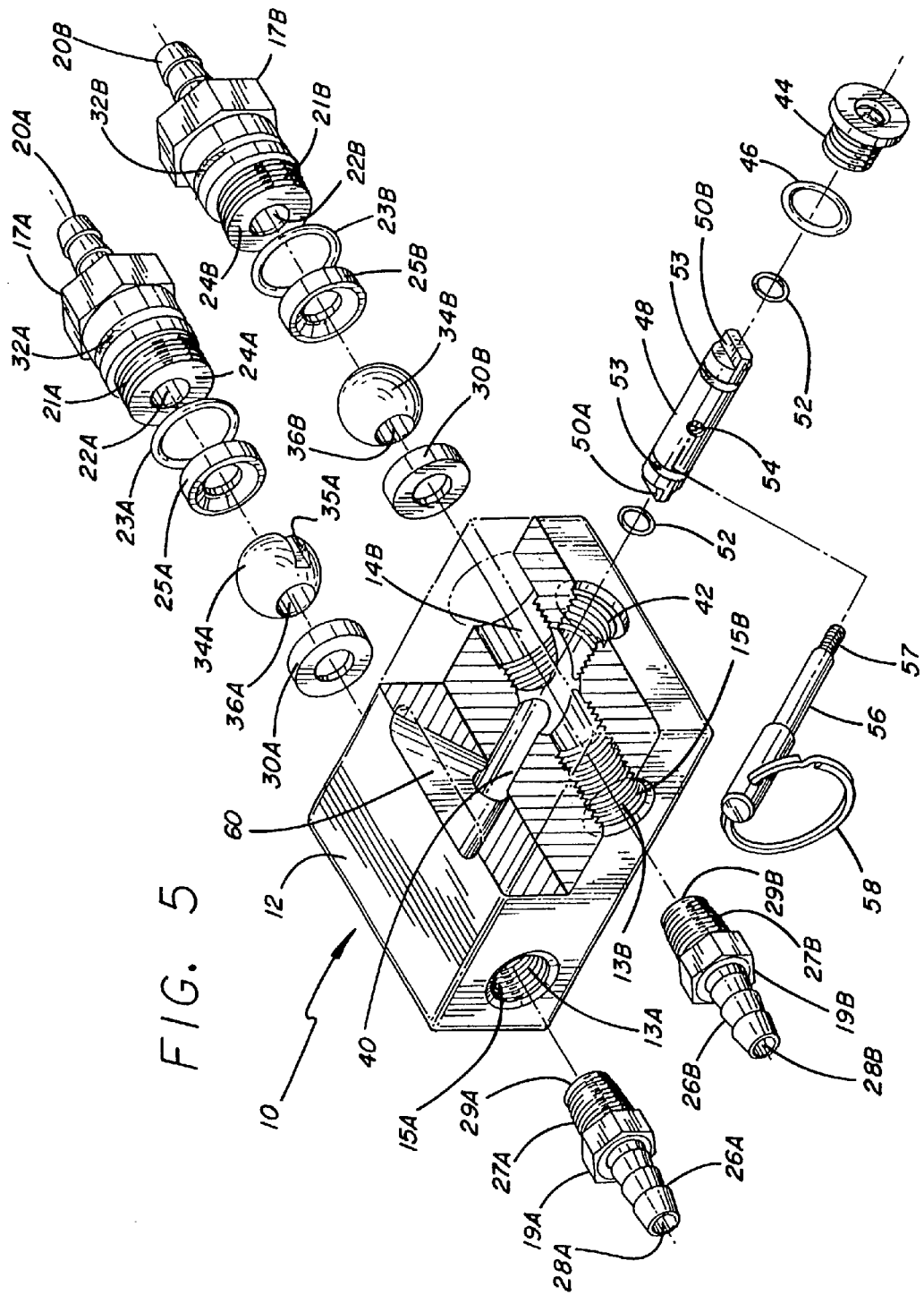
FIG. 5 is a partial sectional exploded view of the dual shut-off valve of FIG. 1.

As shown in FIGS. 3 and 4, when each valve ball 34a, 34b is seated within its corresponding parallel bore 13a, 13b, the valve ball 34a, 34b is rotatable between a valve closed position (shown in FIG. 3) and a valve open position (shown in FIG. 4). In the valve open position, each valve ball center passage 36a, 36b aligns with and is in fluid communication with the corresponding inlet passage 22a, 22b and outlet passage 28a, 28b. In this alignment the valve assembly 10 is in an open position with each inlet passage 22a, 22b being placed in fluid communication with the corresponding outlet passage 28a, 28b. As shown in FIG. 3, each valve ball 34a, 34b can be rotated to its closed position so that its center passage 36a, 36b is not aligned with and does not intersect the inlet passage 22a, 22b and the outlet passage 28a, 28b. In the closed position, the sealing engagement between each valve ball 34a and its corresponding valve seats 25a, 30a, seats 25b, 30b prevents fluid communication between the corresponding inlet passage 22a, 22b and outlet passage 28a, 28b.

Although the ball valves are shown in the embodiment of FIGS. 3 and 4 as spherical valve balls, it will be understood that the term "valve ball" is meant to include valve balls of other shapes (e.g. a more spherical or oblong shape) so long as the valve ball can rotate between a valve closed position, wherein the valve ball passage is not in communication with the corresponding inlet passage and outlet passage, and a valve open position wherein the valve ball passage is in communication with the corresponding inlet passage and outlet passage.

The valve body 12 includes a transverse bore 40 disposed along a longitudinal axis that is perpendicular to the parallel bores 13a, 13b. The transverse bore 40 intersects each of the bore input sections 14a, 14b near the bore shoulder 38a, 38b. The transverse bore 40 terminates at one end at the bore input section 14a and at the other end in a plug opening 42 in the valve body 12. The plug opening 42 is threaded to receive a threaded plug 44. An O-ring seal 46 is mounted on the threaded plug 44 to provide a seal between the plug 44 and the wall of the plug opening 42 when the plug 44 is tightened.

A shaft 48 is positioned within the transverse bore 40. The shaft 48 is coupled at one end 50a to one valve ball 34a seated in the parallel bore 13a and at the other end 50b to the other ball 34b seated in the parallel bore 13b. Each end 50a, 50b of the shaft 48 is in the form of a tab or key adapted to closely fit into the corresponding valve ball slot 36a, 36b such that the longitudinal axis through the shaft 48 intersects the center of each ball 34a, 34b. This configuration provides for alignment and rotational coupling of the shaft 48 with the valve balls 34a, 34b so that the valve balls 34a, 34b simultaneously rotate as the shaft 48 is rotated. O-ring seals 52 are mounted in annular grooves 53 on the shaft 48 on each side of the threaded hole 54 and provide a sealing engagement between the shaft 48 and the wall of the transverse bore 40.

Figure 2:
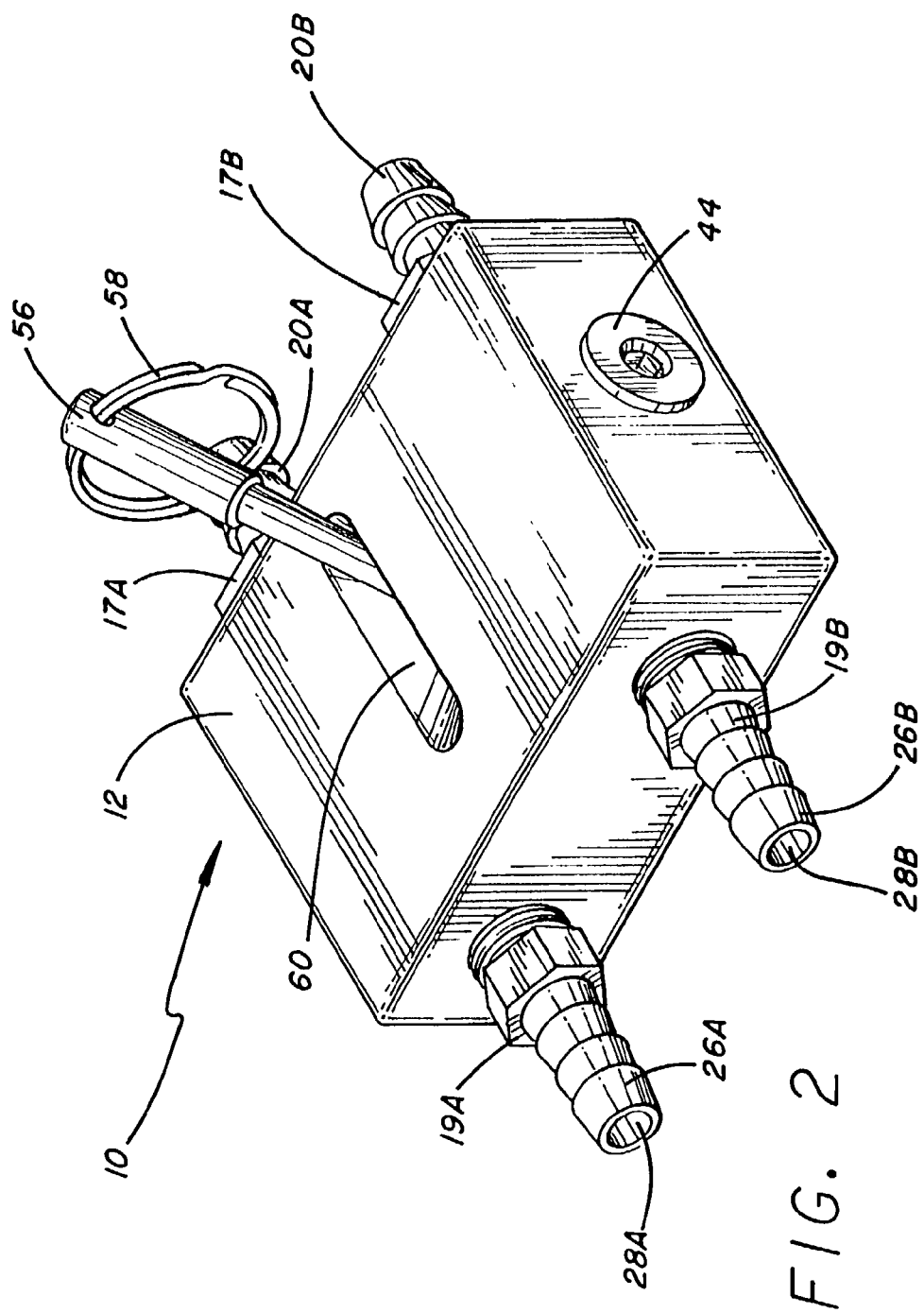
FIG. 2 is a perspective view of the dual shut-off valve of FIG. 1 showing the handle installed and turned to the on position.

The shaft 48 has a transverse hole 54, which is disposed along an axis that is perpendicular to the longitudinal axis of the shaft 48 and is threaded for receiving a threaded handle 56. The shaft 48 and valve balls 34a, 34b can be simultaneously rotated between the open position and the closed position by use of the handle 56. The handle 56 has a threaded end 57 that can be screwed into the threaded hole 54 for removably attaching the handle 56 to the shaft 48. In the valve body 12 is a fan-shaped handle slot 60, which is positioned and sized to intersect the transverse bore 40, to expose the shaft threaded hole 54, and to allow clearance for movement of the handle 56. When attached to the shaft 48, the handle 56 can be moved within the range permitted by the fan-shaped slot 60 to rotate the shaft 30 and simultaneously rotate the valve balls 34a, 34b. The shaft threaded hole 54, the keyed shaft ends 50a, 50b, the valve ball slots 35a, 35b are oriented in relationship to each other such that when the handle 56 is positioned at one end of the fan-shaped slot 60, as shown in FIGS. 1 and 3, each of the valve balls 34a, 34b is rotated into its closed position and fluid flow between each inlet passage 22a, 22b and the corresponding outlet passage 28a, 28b is completely shut off. When the handle 56 is moved to the other end of the fan-shaped slot 60, as shown in FIGS. 2 and 4, each of the valve balls 34a, 34b is rotated into its open position to allow fluid flow between each inlet passage 22a, 22b and the corresponding outlet passage 28a, 28b. Accidental rotation of the shaft can be prevented by removing the handle 56 by unscrewing it from the shaft threaded hole 54. In this way, when the valve balls 34a, 34b are in the open position accidental shut-off of the valve can be prevented. The threaded handle 56 can optionally include a key ring 58 for convenient storage when the handle 56 is removed.

The valve body 12 can include one or more threaded holes (not shown), e.g. on the back of the valve body, for receiving screws for mounting the valve body 12. For example, when used with a boat motor, such a configuration can be used to mount the valve body to the cowling of the motor.

The valve assembly 10 is assembled as follows. Each outlet nipple 19a, 19b is screwed into the corresponding outlet section 15a, 15b of parallel bores 13a, 13b. A suitable sealant, such as Teflon® tape or other sealant known in the art, applied to the outlet nipple threaded end 27a, 27b provides a sealed engagement between each outlet nipple 19a, 19b and the corresponding bore outlet section 15a, 15b. The outlet valve seats 30a, 30b are loaded into position in their corresponding parallel bores 13a, 13b by inserting the seats 30a, 30b into the corresponding bore inlet section 14a, 14b and positioning each of the seats 30a, 30b against the corresponding bore shoulder 38a, 30b. Next, the valve ball 34a is inserted into the bore inlet section 14a (which is distal to the plug opening 42) so that it rests against the outlet valve seat 30a with the center passage 36a generally aligned with the longitudinal axis of the parallel bore 13a and the valve ball slot 35a facing the plug opening 42 (i.e., by inserting the valve ball 34a in the open position). The shaft 48 is then inserted into the transverse bore 40 so that the keyed shaft end 50a mates with the valve ball slot 35a and the shaft threaded hole 54 is exposed through the fan-shaped slot 60. The other valve ball 34b is then loaded by inserting it through the inlet section 14b (which is proximal to the plug opening 42) so that it rests against the outlet valve seat 30b with the center passage 36b generally aligned with the longitudinal axis of the parallel bore 13b and the slot 35b facing the shaft end 50b (i.e., by inserting the valve ball 34b in the open position). When the valve ball 34b is loaded in this fashion, the valve ball slot 35b slides over and mates with the keyed shaft end 50b. The inlet valve seats 25a, 25b are then loaded into the corresponding bore inlet sections 14a, 14b and disposed against the valve balls 34a, 34b. The inlet nipples 17a, 17b are then screwed into the bore inlet sections 14a, 14b and tightened to sealingly seat the valve balls 34a, 34b against their respective valve seats 25a, 25b, 30a, 30b. The plug 44 is screwed into the plug opening 42 and tightened to provide a seal between the plug 44 and the wall of the plug opening 42.

I have manufactured a prototype dual shut-off valve of the type described above for simultaneously shutting off the fuel and oil supply lines of a two-cycle engine. The valve body 12 is machined from aluminum. The inlet nipples 17a, 17b, outlet nipples, 19a, 19b, valve balls 34a, 34b and threaded plug 44 are made of brass. The shaft 48 and the handle 56 are made of stainless steel. The valve seats 25a, 25b, 30a, 30b are made of a PTFE fluoropolymer resin, such as Teflon® fluoropolymer resin marketed by E.I. du Pont de Nemours and Company. It will be understood, however, the shut-off valve need not be fabricated from the materials used for the prototype valve, but instead other suitable materials known in the art may be used.

The above-described embodiment of a shut-off valve in accordance with my invention possesses several advantages. It can be used to simultaneously shut off the fuel supply and the oil supply lines to a two-cycle engine without allowing air to enter the lines. It is convenient and easy to operate and yet can limit accidental shut-off of the fuel and oil supply lines.

Additional advantages and modifications will readily occur to those skilled in the art. For example, modifications can be made to the shut-off valve disclosed above to provide simultaneous shut-off of more than two lines by providing multiple shafts linked in series between valve balls. As another example, the valve ball slots can be positioned relative to the shaft tabbed ends such that, when one valve ball is in the open position the other valve ball is in the closed position, and vice versa. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A shut-off valve for a two-cycle internal combustion engine having a fuel supply line and an oil supply line, the shut-off valve comprising:

a valve body having a first inlet passage in fluid communication with the fuel supply line, a second inlet passage in fluid communication with the oil supply line, a first outlet passage and a second outlet passage;

a first valve ball having a passage therethrough and being rotatable between:

a first valve open position wherein the first valve ball passage is in fluid communication with the first inlet passage and the first outlet passage; and a first valve closed position wherein the first valve ball passage is out of fluid communication with the first inlet passage and the first outlet passage;

a second valve ball having a passage therethrough and being rotatable between:

a second valve open position wherein the second valve ball passage is in fluid communication with the second inlet passage and the second outlet passage; and a second valve closed position wherein the second valve ball passage is out of fluid communication with the second inlet passage and the second outlet passage;

a shaft coupled between the first valve ball and the second valve ball so that, when the shaft is rotated between a first shaft position and a second shaft position, the first valve ball rotates between the first valve open position and the first valve closed position and the second valve ball rotates between the second valve open position and the second valve closed position; and a handle coupled to the shaft to rotate the shaft between the first shaft position and the second shaft position.

2. The shut-off valve of claim 1, wherein:

the first valve ball has a slot adapted to receive a first end of the shaft so that the first valve ball passage is oriented at a right angle to the shaft when the first end of the shaft is positioned in the first valve ball slot; and the second valve ball has a slot adapted to receive the second end of the shaft so that the second valve ball passage is oriented at a right angle to the shaft when the second end of the shaft is positioned in the second valve ball slot.

3. The shut-off valve of claim 1, wherein the first inlet passage is defined, at least in part, by a first inlet nipple adapted to receive the fuel supply line, and the second inlet passage is defined, at least in part, by a second inlet nipple adapted to receive the oil supply line.

4. The shut-off valve of claim 1 wherein the first outlet passage is defined, at least in part, by a first outlet nipple adapted to receive an engine fuel line, and the second outlet passage is defined, at least in part, by a second outlet nipple adapted to receive an engine oil line.

5. The shut-off valve of claim 1 wherein the handle is connected to the shaft at a right angle and projects from a slotted opening in the valve body.

6. The shut-off valve of claim 1 wherein the handle is removable.

7. The shut-off valve of claim 1 wherein the handle includes a key ring.

8. A shut-off valve adapted for simultaneously shutting off a fuel supply line and an oil supply line of a two-cycle internal combustion engine, the shut-off valve comprising:
   a valve body having a first bore and a second bore, the first and second bore being substantially parallel with each other;
   a first inlet nipple disposed, at least in part, within the first parallel bore and having a first inlet passage in communication with the fuel supply line;
   a second inlet nipple disposed, at least in part, within the second parallel bore and having a second inlet passage in communication with the oil supply line;
   a first outlet nipple disposed, at least in part, within the first parallel bore and having a first outlet passage;
   a second outlet nipple disposed, at least in part, within the second parallel bore and having a second outlet passage;
   a first valve ball having a passage therethrough and being rotatable between:
      a first valve open position wherein the first valve ball passage is in fluid communication with the first inlet passage and the first outlet passage; and
      a first valve closed position wherein the first valve ball passage is out of fluid communication with the first inlet passage and the first outlet passage;
   a second valve ball having a passage therethrough and being rotatable between:
      a second valve open position wherein the second valve ball passage is in fluid communication with the second inlet passage and the second outlet passage; and
      a second valve closed position wherein the second valve ball passage is out of fluid communication with the second inlet passage and the second outlet passage;
   a shaft rotatable between a first shaft position and a second shaft position, the shaft being coupled to the first valve ball and the second valve ball so that:
      when the shaft is in the first shaft position, the first valve ball is in the first valve open position and the second valve ball is in the second valve open position; and
      when the shaft is in the second shaft position, the first valve ball is in the first valve closed position and the second valve ball is in the second valve closed position; and
   means for rotating the shaft between the first shaft position and the second shaft position.

9. The shut-off valve of claim 8, wherein:
   the shaft has a first end that mates with a slot in the first valve ball so that the first valve ball passage is oriented generally along an axis at a right angle to the shaft; and
   the shaft has a second end that mates with a slot in the second valve ball so that the second valve ball passage is oriented generally along another axis at a right angle to the shaft.

10. The shut-off valve of claim 8 wherein the means for rotating the shaft between the first shaft position and the second shaft position comprises a handle connected to the shaft at a right angle.

11. The shut-off valve of claim 10 wherein the handle is removable.

12. The shut-off valve of claim 10 wherein the handle includes a key ring.

13. The shut-off valve of claim 8 wherein the first valve ball passage comprises a bore through the center of the first valve ball.

14. The shut-off valve of claim 8 wherein the second valve ball passage comprises a bore through the center of the second valve ball.

15. A method for simultaneously controlling a fuel supply line and an oil supply line of an internal combustion engine, the method comprising:
   providing a shutoff valve including:
      a valve body having a first fluid passage generally oriented along a first axis and a second fluid passage generally parallel to the first fluid passage;
      a first valve ball having a passage therethrough, the first valve ball being positioned within the first fluid passage and being rotatable between:
         an open position wherein first valve ball passage is in fluid communication with the first fluid passage; and
         a closed position wherein the first valve ball passage is not in fluid communication with the first fluid passage;
      a second valve ball positioned within the second passage and being rotatable between;
         an open position wherein the second valve ball passage is in fluid communication with the second fluid passage; and
         a closed position wherein the second valve ball passage is not in fluid communication with the second fluid passage;
      a shaft rotatable between a first shaft position and a second shaft position, the shaft being coupled to the first valve ball so that:
         when the shaft is in the first shaft position, the first valve ball is in the first valve open position and; and
         when the shaft is in the second shaft position, the first valve ball is in the first valve closed position; and
   means for rotating the shaft between the first shaft position and the second shaft position;
   placing the fuel supply line in fluid communication with one of the first fluid passage and the second fluid passage; and
   placing the oil supply line in fluid communication with the other of the first fluid passage and the second fluid passage.

16. The method of claim 15, wherein:
   the shaft has a first end that mates with a slot in the first valve ball so that the first valve ball passage is oriented generally along an axis at a right angle to the shaft; and
   the shaft has a second end that mates with a slot in the second valve ball so that the second valve ball passage is oriented generally along another axis at a right angle to the shaft.

17. The method of claim 15 wherein the means for rotating the shaft between the first shaft position and the second shaft position comprises a handle connected to the shaft at a right angle.

18. The method of claim 15 wherein the first valve ball passage comprises a bore through the center of the first valve ball and the second valve ball passage comprises a bore through the center of the second valve ball.

19. The method of claim 15, wherein:
the shaft is coupled to the second valve ball so that:
when the shaft is in the first shaft position, the second valve ball is in the second valve open position; and
when the shaft is in the second shaft position, the second valve ball is in the second valve closed position.

20. The method of claim 15, wherein:
the shaft is coupled to the second valve ball so that:
when the shaft is in the first shaft position, the second valve ball is in the second valve closed position; and
when the shaft is in the second shaft position, the second valve ball is in the second valve open position.

* * * * *